United States Patent
Hand et al.

(10) Patent No.: US 7,562,898 B2
(45) Date of Patent: Jul. 21, 2009

(54) WORK PLACE AND STORAGE APPARATUS

(76) Inventors: Bill Hand, P.O. Box 1465, Pleasanton, CA (US) 94566; Robert Howe, P.O. Box 1927, Danville, CA (US) 94526-6927

(*) Notice: Subject to any disclaimer, the term of this patent is extended or adjusted under 35 U.S.C. 154(b) by 0 days.

(21) Appl. No.: 11/907,845

(22) Filed: Oct. 18, 2007

(65) Prior Publication Data

US 2009/0102272 A1  Apr. 23, 2009

(51) Int. Cl.
*B62B 1/18* (2006.01)
(52) U.S. Cl. .............. 280/653; 280/47.18; 280/47.31; 298/3
(58) Field of Classification Search .............. 298/2, 298/3, 17 B, 17 S, 17 SG, 17 T, 17 R; 280/653, 280/654, 47.18, 47.31, 760, 47.12, 47.17, 280/47.32
See application file for complete search history.

(56) References Cited

U.S. PATENT DOCUMENTS

| | | | |
|---|---|---|---|
| 832,628 | A | 10/1906 | Schreffler |
| 1,769,271 | A | 7/1930 | Parsons |
| 5,085,447 | A | 2/1992 | Audibert |
| D338,306 | S | 8/1993 | White et al. |
| 5,642,898 | A | 7/1997 | Wise |
| 5,687,979 | A * | 11/1997 | Plevka |
| 5,893,572 | A | 4/1999 | Parks |
| 6,053,587 | A | 4/2000 | Boerder |
| 6,193,265 | B1 | 2/2001 | Yemini |
| 6,935,641 | B2 | 8/2005 | Hahn |
| 7,032,921 | B2 | 4/2006 | Swanner |
| 2002/0144935 | A1 | 10/2002 | Tims |
| 2005/0212238 | A1 | 9/2005 | Conley |
| 2006/0157944 | A1 | 7/2006 | Alexander |
| 2007/0063466 | A1 | 3/2007 | Tiramani et al. |

FOREIGN PATENT DOCUMENTS

GB  8521227  3/1987
GB  9419989.0  10/1996

* cited by examiner

*Primary Examiner*—Stephen Gordon
(74) *Attorney, Agent, or Firm*—Theodore J. Bielen, Jr.

(57) ABSTRACT

A storage and work place apparatus used in conjunction with a wheelbarrow or similar item. The apparatus includes an housing having a bottom portion and a side portion extending outwardly to form a open chamber the bottom portion is intended to a lie atop a wheelbarrow a cover is used in conjunction with the open chamber and is hinged attached to the housing in order to extend laterally from the housing. At least a first leg attainably connects to the housing and extends outwardly to contact a ground surface adjacent the wheel barrow. At least a second leg is rotatable attached to the cover and also extends outwardly therefrom to support the cover above the ground surface when the leg contacts the ground surface.

13 Claims, 3 Drawing Sheets

WORK PLACE AND STORAGE APPARATUS

BACKGROUND OF THE INVENTION

The present invention relates to a novel and useful work place and storage apparatus.

Tools, machines, materials, and the like necessarily be transported from a storage area to a place of work. In the past, tool chest has been used to maintain such implements at hand during construction and manufacturing task. In addition, such tool chest have been mobilized by the addition of casters or wheels. However, tool chest and storage bins for tools and the like are necessarily bulky and difficult to move despite the fact that wheels have been attached. For example, tool chest are not easily moved over uneven terrain surfaces and along serpentine courses.

In the past, devices have been improvised to carry or transport tools and the like. U.S. Pat. Nos. 5,085,447 7,032,921 US Patent Publication 2006/0157944, United States Patent Application Publication 20070063466, and Uk Patent Application 2,293,757 describe portable table structure for transporting equipment and tools which are generally compact or collapsible in nature.

U.S. Pat. No. 8,32628, U.S. Design Pat. No. 338,306, and UK Patent Application 2,31965 describe carts having containers that are movable and may be used to transport tools and equipment.

U.S. Pat. Nos. 5,642,898, 5,893,572, 6,053,587, and 6,935,641 show portable tool carts which include benches or tables to allow a work place for the user.

U.S. Pat. No. 6,193,265 and UK Patent Application 2179305 show wheel barrow structures possessing novel attachment such as handles and legs.

U.S. Pat. No. 1,769,271 and U.S. Patent Application Publications 2002/0144935, 2005/0212238 describe wheel barrow attachments in the form of platforms and bins which may be used to support items and process materials.

A storage and work place apparatus useable with a wheelbarrow or similar item would be a notable advanced in the manufacturing and construction arts.

BRIEF SUMMARY OF THE INVENTION

A storage and work place apparatus used in conjunction with a wheelbarrow or similar item is hereinbelow provided.

The apparatus of the present invention utilizes a housing having a bottom portion and a side portion extending outwardly from the bottom portion to form an open chamber. The bottom portion of the housing lies atop a wheelbarrow and may be temporally or permanently fixed thereto. The bottom of the housing may also include a projection which extends downwardly into the receptacle portion of the wheelbarrow in addition, a container may be utilized with the projection such that the container extends below the housing and into the wheel barrow receptacle. The container may be adjustably oriented with respect to the container in order to conform to the contours of the wheelbarrow receptacle portion.

A cover is also employed with the present apparatus to overlie the open chamber of the housing. The cover is hingely attached to the housing for extension laterally from the housing in a rotatable manner. The cover may be formed with a flat under surface which becomes a free work place surface when such extension takes place.

At least a first leg and, preferably, a cortex of legs are rotatably attached to the housing. For example, such cortex of legs may be rotatably attached to the bottom portion of the housing such that such extension may take place downwardly from the housing when it is poised atop a wheel barrow. The cortex of legs would be able to reach the ground surface upon which the wheel barrow is to be moved. Each of the legs of the cortex of the legs may be adjustable in length to accommodate the particular height of the wheelbarrow with which the apparatus of the present invention is to be used. In addition, at least a second leg and, preferably a pair of legs is rotatable attached to the cover. Thus, when the cover is rotated outwardly from the housing, the pair of legs will support the cover such that the flat under surface is assessable to the user for a work place.

It may be apparent that a novel and useful storage and work place apparatus use in conjunction with a wheel barrow has been hereinabove described.

It is therefore an object of the present invention to provide a storage and work place apparatus which facilitates the transportation of tools and the like to and from a job site.

Another object of the present invention is to provide a storage and work place apparatus which is capable of moving large and heavy tool chest to and from a work site by the use of a conventional wheel barrow.

Another object of the present invention is to provide a storage and work place apparatus which securely stores a tool chest and protects the same from the elements.

A further object of the present invention is to provide a storage and work place apparatus use in conjunction with a wheelbarrow that saves time and money during construction and manufacturing activities.

Yet another object of the present invention is to provide a storage and work place apparatus which utilizes the storage capacity of a wheelbarrow and creates a work surface which forms part of mobile unit.

A further object of the present invention is to provide a storage and work place apparatus which is easily retrofitted to existing wheel barrows which are employed to provide mobility.

The invention possesses other objects and advantages especially as concerns particular characteristics and features thereof which will become apparent as the specification continues.

Figure 1:
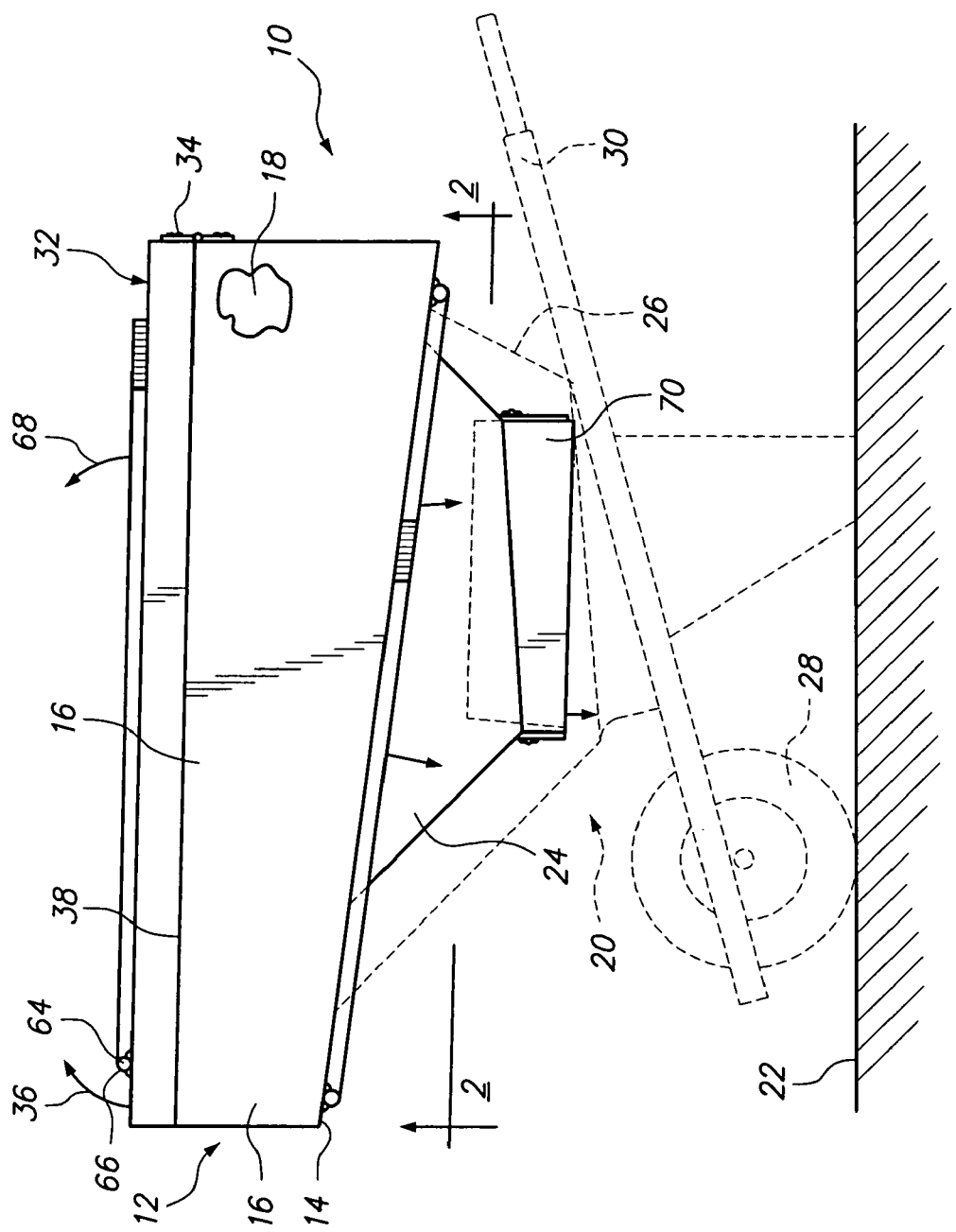
FIG. 1 is a side elevational view of the apparatus of the present invention used in conjunction with a wheelbarrow that is depicted in phantom.

For a better understanding of the invention reference is made to the following detailed description of the preferred embodiments of the invention which should be taken in conjunction with the above described drawings.

DETAILED DESCRIPTION OF THE PREFERRED EMBODIMENTS OF THE INVENTION

Various aspects of the present invention will evolve from the following detailed description of the preferred embodiments thereof which should be referenced to the prior described drawings.

A preferred embodiment of the invention as a whole is shown in the drawings by reference character 10. Apparatus 10 includes as one of its elements a housing 12 which may be constructed of any suitable rigid or semi rigid material. Housing 12 includes a bottom 14 and a side portion 16 extending therefrom to form an open chamber 18. Housing 12 is intended to lie above and atop a wheelbarrow 20, FIGS. 1, 3, and 4, and may be attached by any suitable fastening systems, such as nuts and bolts, clamps, welding, and the like. Housing 12 is also formed with a projection 24 which extends from bottom 14. Projection 24 is intended to extend into the receptacle or load carrying portion 26 of wheelbarrow 20. Wheel barrow 20 also includes a wheel 28 which moves across ground surface 22 handle part 30 is used to maneuver wheelbarrow 20 in the convictional manner.

Apparatus 10 is also provided with a cover 32 which encloses open chamber 18 of housing 12 and is hingedely attached to container 12 by hinge 34 to permit the movement of cover 32 according to directional arrow 36, FIG. 1. That is to say, cover 32 extends laterally from housing 12 by this movement which is clearly shown in FIG. 4 and will be discussed hereinafter. Moreover, cover 32 is provided with a flattened surface 38 which becomes accessible upon the extension of cover 32 from housing 12.

Figure 4:
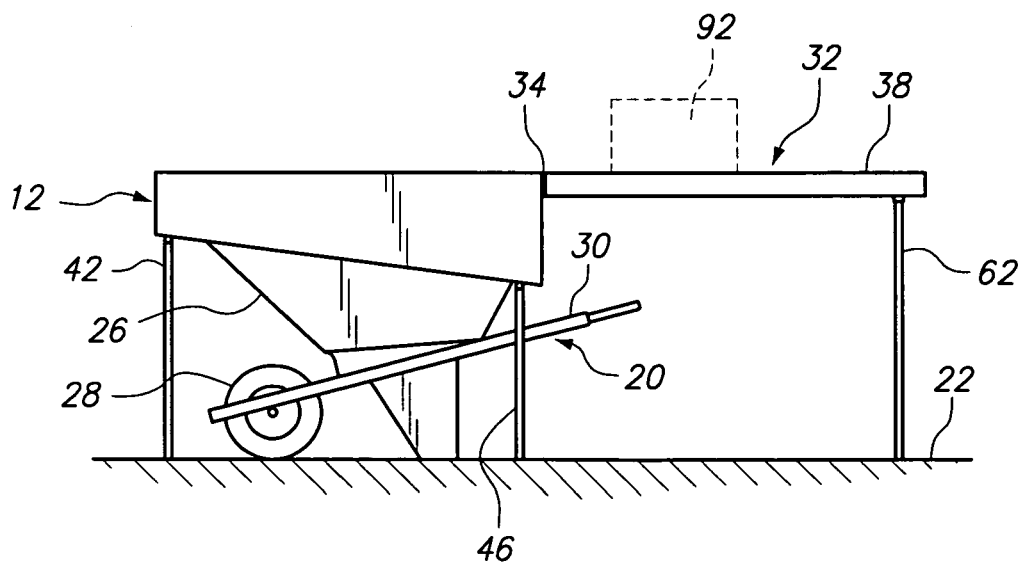
FIG. 4 is a schematic view of the apparatus of the present invention and its open configuration for use as storage in work place item.

Housing 12 is fitted with legs 40, 42, 44, and 46 legs 40 and 42 are connected to one another by a spanning bar 48 which is rotatably attached to housing 12 via pivot 50 and 52. Likewise, legs 44 and 46 are connected to a spanning bar 54 and rotates about pivots 56 and 58. It should be noted that legs 40, 42, 44, and 46, extend outwardly from housing 12 and lie adjacent wheel barrow 20 as depicted in FIG. 4. Thus, legs 40, 42, 44, and 46 hold housing 12 and wheelbarrow 20 in an upright position such that chamber 18 is assessable within housing 12.

In addition, legs 60 and 62 are rotatably attached to cover 32. It should be apparent that legs 60 and 62 are connected to one another via a spanning bar 64 and rotate about pivot 66 and another not shown which are identical to the arrangement with the respect to pivots 50 and 52, as well as pivots 56 and 58, with respect to housing 12. Again, legs 60 and 62 extend outwardly from cover 12 according to directional arrow 68, FIG. 1, and contact ground surface 22 to provide leveling for flatten surface 38 which may be used as a work place.

Figure 3:
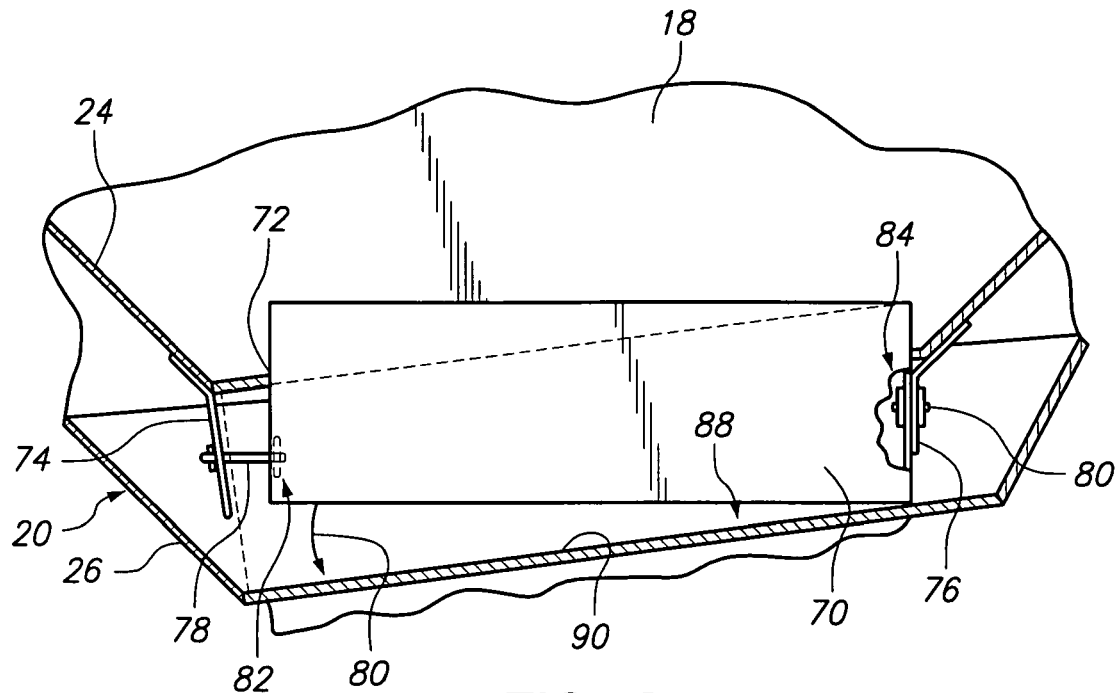
FIG. 3 is a partial sectional view of the projection portion of the apparatus and the wheelbarrow with the adjustable container depicted in whole.

Referring now to FIG. 3, it may be observed that apparatus 10 may also include a container 70 which lies at the lower most portion of projection 24 that is roughly in the shape of a truncated pyramid. Container 70 is positioned in opening 72 and may move downwardly therefrom by the use of slotted brackets 74 and 76. Brackets 74 and 76 are welded or otherwise fixed to projection 24 and extend downwardly to accept bolts 78 and 80 which are connected to container 70 by the use of nuts 82 and 84. Nuts 82 and 84 may be of any suitable configuration such as hexagonal nuts, wing nuts, and the like. In any case, container 70 slides downwardly as shown in FIG. 3 according to directional arrows 86 and 88 and is intended to a lie atop the base 90 of receptacle or load bearing portion 26 of wheelbarrow 20 container 70 may be of an open or closed configuration and be employed to confine smaller tools and the like at the predilection of the user of apparatus 10.

Figure 2:
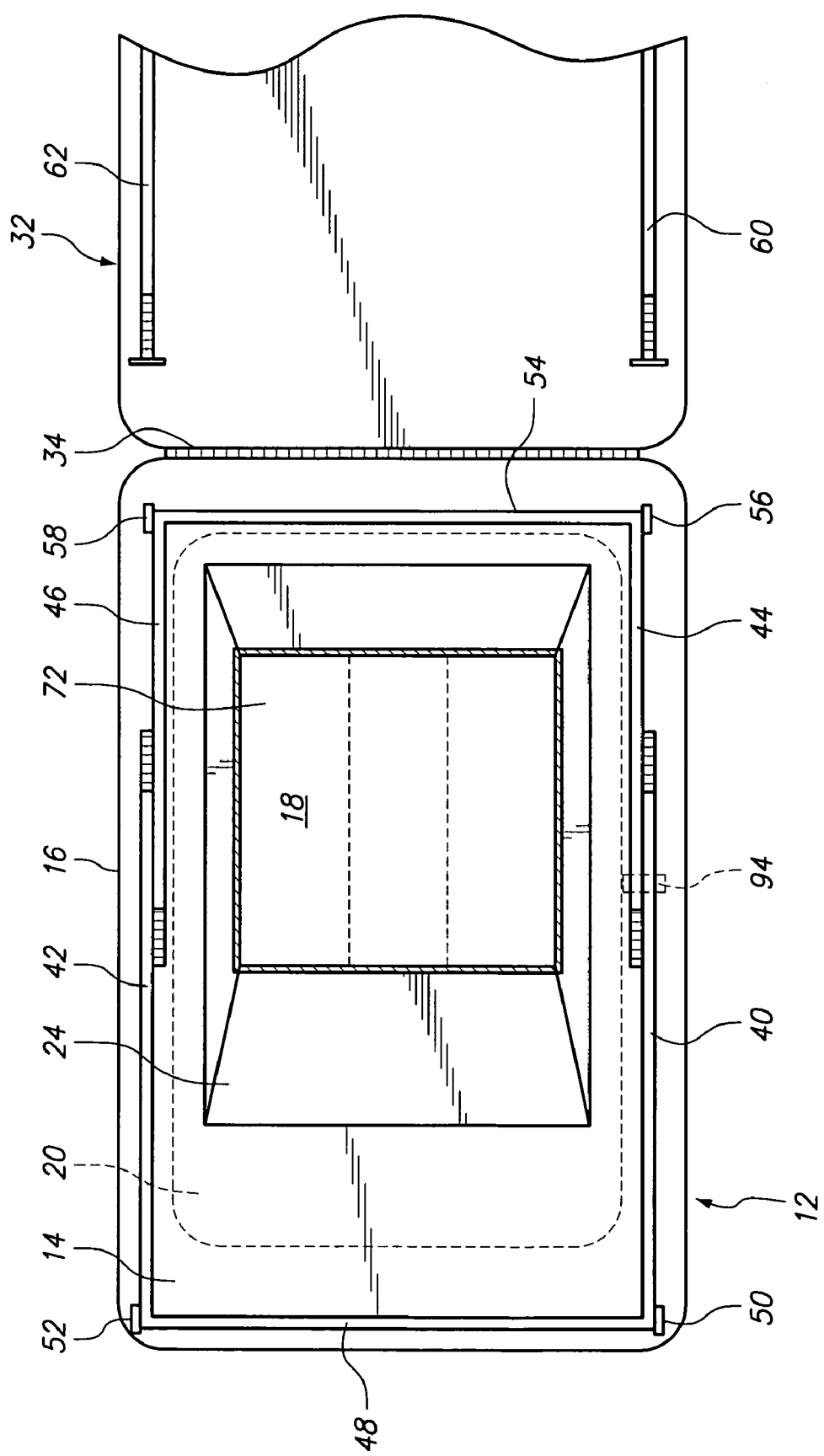
FIG. 2 is a sectional view taken along line 2-2 of FIG. 1.

In operation, the user places apparatus 10 in its close configuration, FIG. 1, atop wheelbarrow 20. Certain cases, apparatus 10 may be fixed to wheelbarrow 10 by the use of brackets or other fasteners (not shown). Wheelbarrow 20 is then moved by grasping handle 30 and rolled along ground surface 22 the desired place of use of apparatus 10. Needless to say, housing 12 may be filled with tools, materials, and other items typical used in a construction or any manufacturing work place in which the transportation of these items to and from a site of secure storage is required. When wheelbarrow 20 is again stopped, cover 32 is rotatable extended from container 12 and legs 62 and 64 are rotatable moved into the position shown in FIG. 4, to support flatten surface 38 and roughly horizontal position. Legs 40, 42, 44, and 46 of container 12 are also extended to contact ground surface 22 to lend stability and support to container 12 and wheelbarrow 20 and maintain the same in the position shown in FIG. 4 to allow ready access to items in open chamber 18. Surface 38 may be employed to support pools of materials or as a working surface to manipulate and configure construction and manufacturing items. Bulk container 92, FIG. 4, is illustrated to show such support afforded by cover 32. The following use of apparatus 10 in this manner, cover 32 is again folded back into the position shown in FIG. 1. Legs 40, 42, 44, 46, 60, and 62 are folded upwardly into the configuration depicted in FIG. 1 also. Clips or straps such as strap 94, FIG. 2, may be used to hold legs in place while apparatus 10 is in the configuration depicted in FIG. 1. Apparatus 10 is then wheeled into a storage area or other secure other place to ready the same for use in the future.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A storage and workplace apparatus used in conjunction with a wheelbarrow having a receptacle and being movable along a ground surface comprising:
    a. a housing having a bottom portion and a side portion extending outwardly to form an open chamber, said bottom portion lying atop the wheelbarrow;
    b. a cover for said open chamber, said cover hingedely attached to said housing for extending laterally from said housing;
    c. at least a first leg and a second leg being rotatably connected to said housing to extend outwardly from said housing adjacent the wheelbarrow and into contact with the ground surface; and
    d. at least a third leg rotatably attached to said cover to extend outwardly therefrom adjacent the wheelbarrow and into contact with the ground surface.

2. The apparatus of claim 1 in which said bottom portion of said housing includes a projection, said projection extending into the receptacle of the wheelbarrow.

3. The apparatus of claim 1 in which said at least a first leg comprises one pair of legs, each leg of said one pair of legs being rotatably connected to said housing for extending outwardly therefrom.

4. The apparatus of claim 3 in which said at least a second leg further comprises another pair of legs, each of said another pair of legs being rotatably connected to said housing for extending outwardly therefrom.

5. The apparatus of claim 4 in which said at least a third leg comprises yet another pair of legs, each of said yet another pair of legs being rotatably connected to said cover for extending outwardly therefrom.

6. The apparatus of claim 1 in which said cover further comprise a flattened surface which becomes accessible upon said cover extending laterally from said housing.

7. The apparatus of claim 6 in which said at least a first leg comprises one pair of legs, each leg of said one pair of legs being rotatably connected to said housing for extending outwardly therefrom.

8. The apparatus of claim 7 in which said at least a second leg further comprises another pair of legs, each of said another pair of legs being rotatably connected to said housing for extending outwardly therefrom.

9. The apparatus of claim 8 in which said at least a third leg comprises yet another pair of legs, each of said yet another pair of legs being rotatably connected to said cover for extending outwardly therefrom.

10. The apparatus of claim 2 which further comprises a container, said container being connected to and being adjustably movable with respect to said projection for permitting resting of said container on the receptacle of the wheelbarrow.

11. The apparatus of claim 10 in which said at least a first leg comprises one pair of legs each leg of said one pair of legs being rotatably connected to said housing for extending outwardly therefrom.

12. The apparatus of claim 11 in which said at least a second leg further comprises another pair of legs, each of said another pair of legs being rotatably connected to said housing for extending outwardly therefrom.

13. The apparatus of claim 12 in which said at least a third leg comprises yet another pair of legs, each of said yet another pair of legs being rotatably connected to said cover for extending outwardly therefrom.

* * * * *